United States Patent [19]

Darr

[11] Patent Number: 5,358,158
[45] Date of Patent: Oct. 25, 1994

[54] FISHING REEL HOLDER

[75] Inventor: Paul Darr, HCR 68, Box 42, Bridgewater Corners, Vt. 05035

[73] Assignees: Paul Darr; Christine M. Baranowski, Bridgewater Corners, Vt.

[21] Appl. No.: 143,653

[22] Filed: Jan. 3, 1994

[51] Int. Cl.⁵ .............................................. B65H 75/40
[52] U.S. Cl. .................................... 224/162; 224/249; 224/250; 224/252; 224/269; 224/901; 43/22; 242/404.1
[58] Field of Search ............... 224/162, 252, 901, 253, 224/269, 249, 250; 43/22, 21.2; 242/96

[56] References Cited

U.S. PATENT DOCUMENTS

| 1,013,347 | 1/1912 | Wetzel | 224/162 |
| 2,101,174 | 12/1937 | Grahame | 224/162 |
| 2,361,189 | 10/1944 | Fratt | 224/162 |

Primary Examiner—Linda J. Sholl
Attorney, Agent, or Firm—John J. Welch, Jr.

[57] ABSTRACT

The instant device is made up of a semi-rigid, one piece belt clip with two sides worn on the belt of a fisherman, with touch fastener material permanently affixed to the one piece, two sided belt clip with two identical strips of hook tape stitched to the touch fastener material close to the bottom edge of the side of the belt clip furthest from the body of a fisherman wearing the device on the fisherman's belt and with a slit in each of the strips of hook tape which slits are amenable to receipt of the respective ends of a fishing reel.

1 Claim, 3 Drawing Sheets

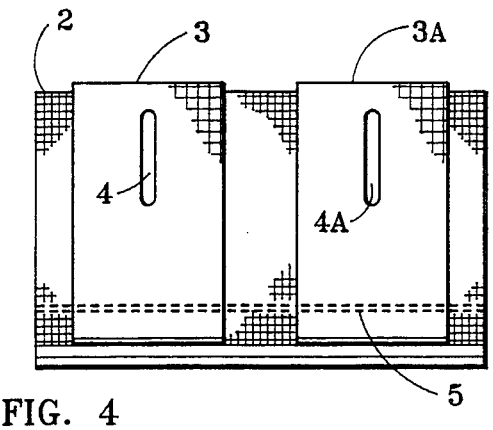
FIG. 4
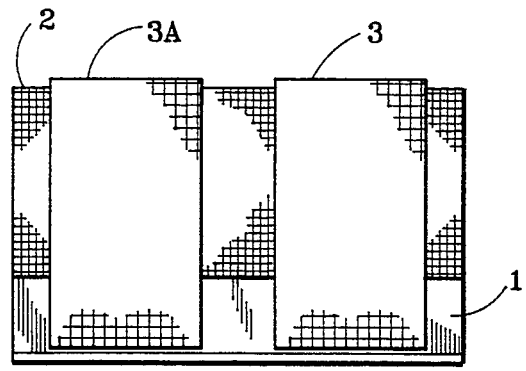
FIG. 5
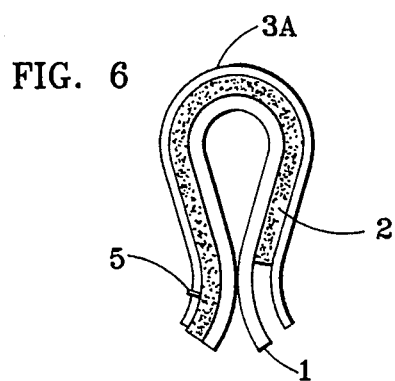
FIG. 6
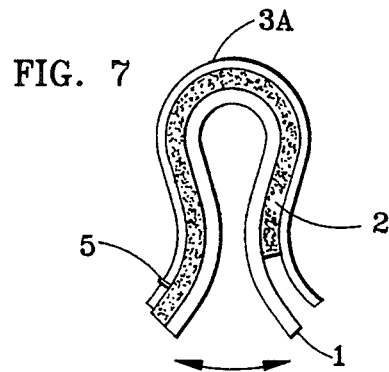
FIG. 7
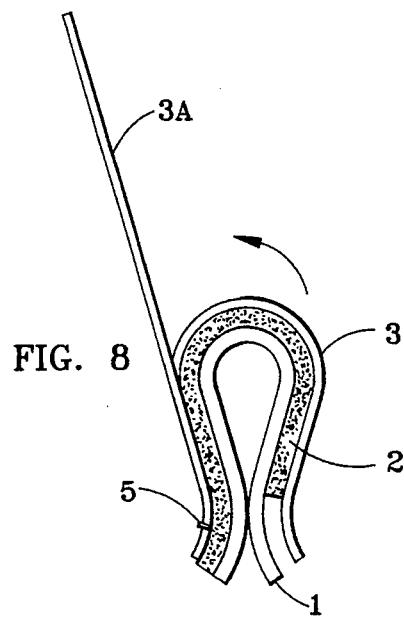
FIG. 8
FIG. 9
FIG. 10
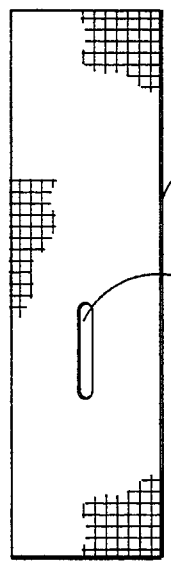
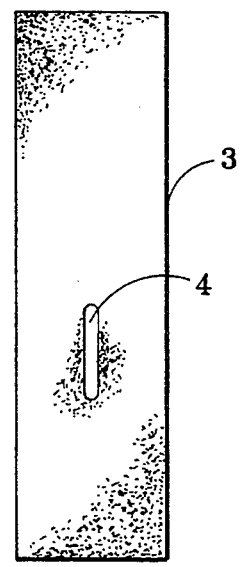

FISHING REEL HOLDER

FEDERALLY SPONSORED RESEARCH AND DEVELOPMENT

There is no involvement with any federally sponsored research and development as respects the instant invention.

CROSS-REFERENCES TO PRIOR APPLICATIONS

There are no cross references to any prior or parent applications as respects the instant invention.

BACKGROUND OF THE INVENTION

1. Field of the Invention

The field of the instant invention encompasses those sorts of devices intended to serve the purpose of simplifying fishing undertakings.

2. Possible Prior Art

The following references may relate in some way to the essence of the instant invention:

| Inventor | Invention | U.S. Pat. No. | Date |
| --- | --- | --- | --- |
| 1. Sanchez, Jr. | Belt Mounted Rod Holder | 4,896,806 | 1/30/90 |
| 2. M. Emanuel | Fishing Tackle | 3,010,242 | 11/28/61 |
| 3. Peterson | Quick Release Retention of Work Pieces | 4,690,316 | 9/1/87 |
| 4. Bond, Sr. | Pool Cue Holder | 4,953,770 | 9/4/90 |
| 5. Ventura | Cordless Phone Holder | 4,771,927 | 9/20/88 |
| 6. Meldrum | Wrist or Armband for Holding Camera | 4,509,667 | 4/9/85 |
| 7. Myers | Adjustable Carrier | 4,234,116 | 11/18/80 |

A SUMMARY OF THE INVENTION

A Brief Description of the Invention

The instant invention consists of a one piece, two sided clip component that fits on the belt of a fisherman. Affixed permanently to virtually the whole of the outer surface of the one piece, two sided belt clip component is a layer of nylon touch fastener material. Such touch fastener material serves as a base to which there are stitched two strips of hook tape of identical shape and size. Finally, within each such strip is one centrally located slit. Utilization of the invention consists merely of clipping it to one's belt, fitting one end of a fishing reel into the slit of one of strips of hook tapes, peeling away the other strip and inserting the reefs other end into the slit of the peeled back strip and then affixing the peeled back strip to the outer surface of the permanently fastened velcro layer. The fisherman is then ready to fish by way of running the line from his reel down and beyond the shaft of the fishing rod in the fisherman's hand. Finally, whereas, both strips are identical, it makes no difference which one is initially peeled back. Hence, it makes no difference whether the invention is worn by a fisherman on his right side or left side such that it therefore readily accommodates the assembly capabilities of both left handed and right handed fishermen.

An Object of the Invention

It is particularly important for fly fisherman especially to have a lot of play as it were, in their rods. Such play or maneuverability as respects their rods is greatly enhanced if no reel is on the rod. Hence, one object of the instant invention is to conveniently hold a fisherman's reel but in close proximity to the fisherman's rod so as to enhance the rod's maneuverability. Also, loss of a reel and rod during the course of a fishing undertaking as, for example, when a reel and rod unit might fall out of a boat into a lake is always a potential problem for a fisherman. This potential problem is however totally obviated by resort to use of the instant invention. The holding of a reel by the instant invention to a fisherman's belt with the line from such reel threaded along the shaft of a rod makes it impossible for either the reel or rod to ever be lost during fishing.

Respectfully submitted, the instant invention is a virtually revolutionary fishing accessory that is not only new and unique but, for the foregoing reasons, unquestionably useful as well.

A DESCRIPTION OF THE DRAWINGS

FIG. 4 is a frontal view of the instant device.

FIG. 5 is a posterior view of the instant device.

FIG. 6 is an end view of the instant device.

FIG. 7 is an end view of the instant device illustrating separation of the bottom portions of the device's one piece, two sided belt clip component as would occur when the device is slipped onto the belt of a fisherman.

FIG. 8 is an end view of the device illustrating the peeling back of one of its two identical hook tapes strips stitched to the touch fastener backing material permanently affixed to the outer surface of the device's one piece, two sided belt clip component.

FIG. 9 is a frontal view of one of the device's two identical hook tape strip components.

FIG. 10 is a posterior view of one of the device's two identical hook tape strip components.

A DESCRIPTION OF THE PREFERRED EMBODIMENT

Figure 1:
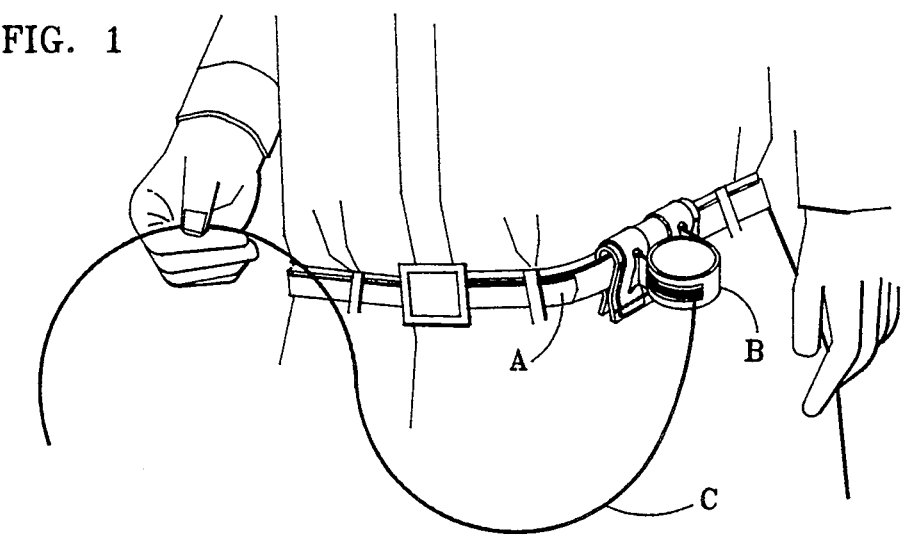
FIG. 1 shows the instant device being worn on a fisherman's left side and ready for use.
Figure 2:
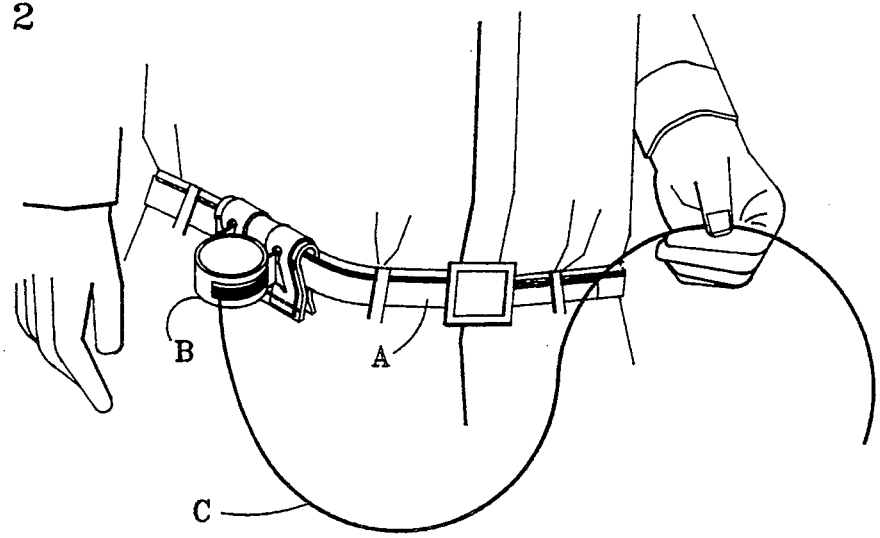
FIG. 2 shows the instant device being worn on a fisherman's right side and ready for use.
Figure 3:
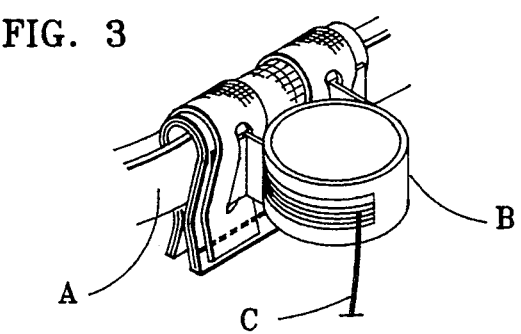
FIG. 3 is a close-up view of a fishing reel held by the instant device on a fisherman's belt.
Figure 11:
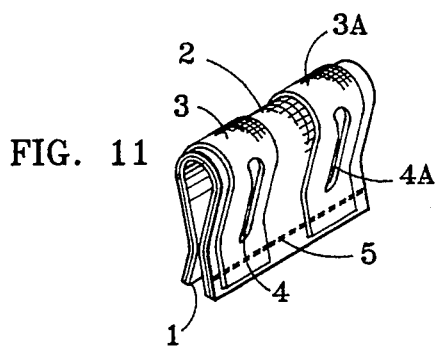
FIG. 11 is a perspective view of the instant device.
Figure 12:
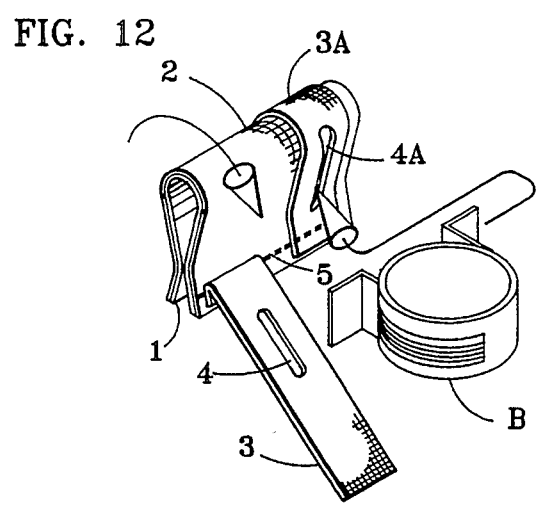
FIG. 12 is a perspective view of the instant device with one of two its hook tape strip components peeled back in apposition to a fishing reel.
Figure 13:
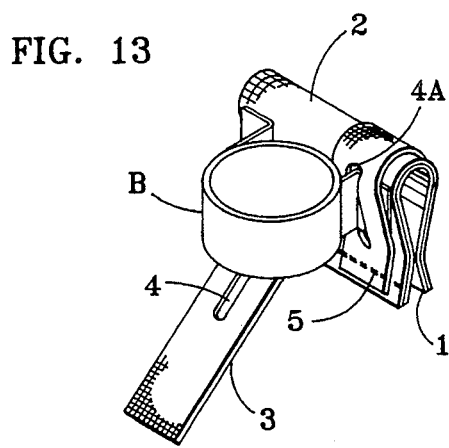
FIG. 13 is a perspective view of the instant device with one of its two hook tape strip components peeled back with one end of a fishing reel in apposition thereto inserted into the slit found in the device's other hook tape strip component.
Figure 14:
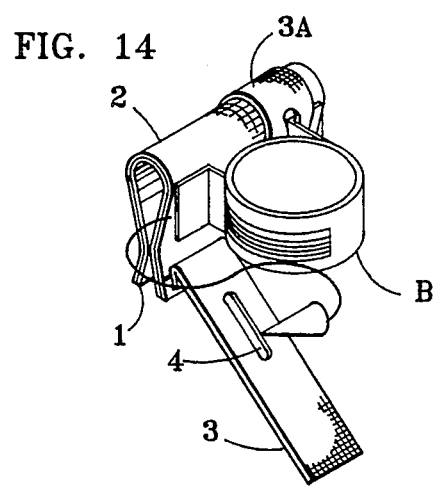
FIG. 14 is a perspective view of the instant device with one of its two hook tape strip components peeled back with one end of a fishing reel in apposition thereto inserted into the slit found in the device's other hook tape strip component and showing the manner in which the other end of the fishing reel will fit into the slit in the peeled back hook tape strip component.
Figure 15:
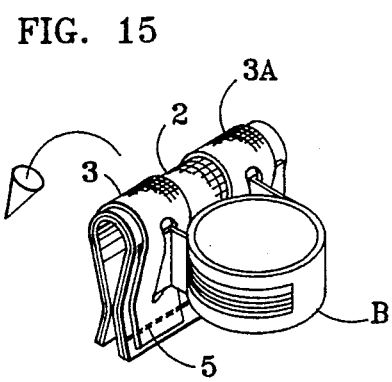
FIG. 15 is a perspective view of the instant device with fishing reel affixed thereto.
Figure 16:
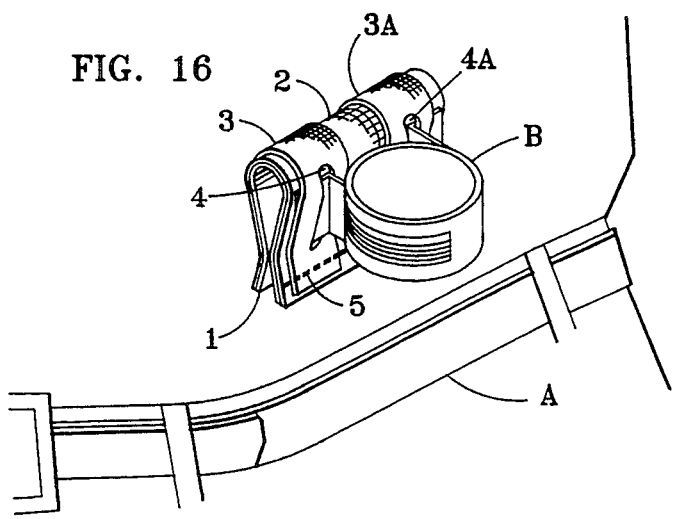
FIG. 16 is a perspective view of the instant device with fishing reel affixed thereto in apposition to a belt being worn by a fisherman.

FIG. 1 shows the instant device with a held fishing reel B affixed to a fisherman's belt A on the fisherman's left side. It also shows the ease with which the fisherman is able to manipulate a fishing line C wound on the held reel. FIG. 2 shows what FIG. 1 shows except from the fisherman's right side. The device is readily amenable for use by either right handed or left handed fishermen. FIG. 3 is a close up view of the instant device with a held fishing reel B affixed to a fisherman's belt A. Line C is also shown in FIG. 3. FIG. 4 is a view of the outermost side of the instant device as it would be seen when affixed to a belt A. In FIG. 4 there is to be seen touch fastener backing material 2 typically made of nylon circumscribing and permanently affixed to the outer surface of the one piece, two sided belt clip component 1 of the device as can be seen in FIG. 5, a view of innermost side of the instant device with regards to its positioning with respect to a fisherman's body when affixed to that fisherman's belt A. FIG. 4 also shows two identical strips of hook tape typically made of nylon, to wit; hook tape strip component 3 and hook tape strip component 3A stitched by way of stitch 5 to touch fastener backing material 2. Hook tape component 3 is characterized by the presence of a centrally located slit 4. Hook tape strip component 3A is characterized by the presence of a centrally located slit 4A. FIG. 6 is an on end view of what is seen in FIG. 4 and serves to depict the device in isolation and not on a belt A. FIG. 7 shows what is shown in FIG. 6 but also shows how the bottom ends of the device's one piece, two sided belt clip component 1 separate for purposes of affixing it to a belt A. FIG. 8 shows what is shown in FIG. 6 but further illustrates how one of the two identical strips of hook tape, here hook tape strip component 3A is amenable to being peeled away from touch fastener backing material 2. FIG. 6, FIG. 7 and FIG. 8 could have just as readily served to depict instead the opposite end view of the device and the views with respect to the apposition of parts would have been the same as are here shown except that hook tape strip component 3 instead of hook tape strip component 3A would have then been featured in FIG. 6, FIG. 7 and FIG. 8. FIG. 9 shows in frontal view one of the device's two identical hook tape strip components. FIG. 10 shows in posterior view one of the device's two identical hook tape strip components. Hook tape strip component 3 as shown in FIG. 11 in a perspective view of the device is peeled back as seen in FIG. 12. One end of a fishing reel is inserted into slit 4A of the hoop tape strip component 3A of the device as is illustrated by the arrow in FIG. 12. The other end of the fishing reel is then inserted into slit 4 of hook tape strip component 3 while hook tape strip component 3 is peeled back as shown in FIG. 13 and the arrow in FIG. 14. As illustrated in FIG. 15 by virtue of the arrow appearing therein, after the other end of the fishing reel is inserted into slit 4 of hook tape strip component 3, hook tape strip component 3 is reattached by a fisherman to touch fastener backing material 2. Finally, as can be seen in FIG. 16, the instant device with attached fishing reel is ready to be clipped by a fisherman to the fisherman's belt A in order to commence fishing as contemplated in FIG. 1. Also, it should be noted that FIGS. 12, 13, 14 and 15 could have been drawn showing instead a peeled back hook tape strip component 3A to result in the commencement of fishing as contemplated in FIG. 2.

What is claimed is:

1. A fishing reel holder, comprising.
  a) a semi-rigid, one piece belt clip with two sides;
  b) touch fastener material permanently affixed to the outer surface of said semi-rigid, one piece belt clip;
  c) a first hook tape strip stitched to said touch fastener material close to the bottom edge of the side of said semi-rigid, one piece belt clip furthest from the body of a fisherman wearing said semi-rigid belt clip affixed to said fisherman's belt;
  d) a slit in said first hook tape strip;
  e) a second hook tape strip identical in size and shape to said first hook tape strip stitched to said touch fastener material close to the bottom edge of the side of said semi-rigid, one piece belt clip located furthest from the body of said fisherman wearing said semi-rigid, one piece belt clip affixed to said fisherman's belt;
  f) a slit in said second hook tape strip;

* * * * *